United States Patent
Rioult et al.

(10) Patent No.: US 9,855,973 B2
(45) Date of Patent: Jan. 2, 2018

(54) MOTOR VEHICLE BODYSHELL STRUCTURE WITH REINFORCEMENTS FOR DISTRIBUTING FORCES RELATED TO A REAR SHOCK ABSORBER OF THE VEHICLE

(71) Applicant: RENAULT s.a.s., Boulogne Billancourt (FR)

(72) Inventors: Olivier Rioult, Voisins-le-Bretonneux (FR); Herve Gaumont, Velizy (FR); Jerome Caillard, Gif sur Yvette (FR); Jean-Luc Knop, Saint Thibault des Vignes (FR)

(73) Assignee: RENAULT s.a.s., Boulogne Billancourt (FR)

( * ) Notice: Subject to any disclaimer, the term of this patent is extended or adjusted under 35 U.S.C. 154(b) by 0 days.

(21) Appl. No.: 15/113,700

(22) PCT Filed: Jan. 9, 2015

(86) PCT No.: PCT/FR2015/050048
§ 371 (c)(1),
(2) Date: Jul. 22, 2016

(87) PCT Pub. No.: WO2015/110735
PCT Pub. Date: Jul. 30, 2015

(65) Prior Publication Data
US 2017/0001668 A1  Jan. 5, 2017

(30) Foreign Application Priority Data

Jan. 23, 2014  (FR) ..................................... 14 50551

(51) Int. Cl.
*B62D 25/08* (2006.01)

(52) U.S. Cl.
CPC ........... *B62D 25/08* (2013.01); *B62D 25/087* (2013.01); *B62D 25/088* (2013.01)

(58) Field of Classification Search
CPC ..... B62D 25/08; B62D 25/087; B62D 25/088
(Continued)

(56) References Cited

U.S. PATENT DOCUMENTS

| | | | |
|---|---|---|---|
| 5,127,666 A * | 7/1992 | Fujinaka | ................ B60G 3/202 |
| | | | 280/124.153 |
| 5,246,263 A * | 9/1993 | Tanaka | ................. B62D 21/152 |
| | | | 296/187.11 |
| 6,196,622 B1 * | 3/2001 | Brodt | ................... B62D 25/087 |
| | | | 296/203.04 |

FOREIGN PATENT DOCUMENTS

| JP | 2007-62590 A | 3/2007 |
|---|---|---|
| JP | 2007062590 A * | 3/2007 |

(Continued)

OTHER PUBLICATIONS

International Search Report dated Mar. 13, 2015 in PCT/FR15/050048 Filed Jan. 9, 2015.

(Continued)

*Primary Examiner* — Jason S Morrow
*Assistant Examiner* — E Turner Hicks
(74) *Attorney, Agent, or Firm* — Oblon, McClelland, Maier & Neustadt, L.L.P.

(57) ABSTRACT

A body shell structure of a motor vehicle includes a side superstructure of the body shell defining on either side of the vehicle two recess portions for wheel arch housings of the vehicle connected by a floor of the vehicle. The body shell structure includes, in each of the two recess portions for wheel arch housing, a wheel arch housing part and at least one mount for attaching the rear shock absorber, assembled by edges thereof to each of the wheel arch housing parts. The wheel arch housing part defines at least one substantially (Continued)

oblique surface portion around and beyond the edges of the mount. The superstructure also includes a structural plate rigidly connected to an oblique surface portion of the wheel arch housing part and secured to a substantially vertical surface portion of the superstructure.

12 Claims, 3 Drawing Sheets

(58) Field of Classification Search
 USPC .................... 296/203.03, 30, 187.12, 198
 See application file for complete search history.

(56) References Cited

FOREIGN PATENT DOCUMENTS

| | | | |
|---|---|---|---|
| JP | 2013-1123 A | | 1/2013 |
| JP | 2013001123 A | * | 1/2013 |

OTHER PUBLICATIONS

French Search Report dated Sep. 25, 2014 in French Application 14 50551 Filed Jan. 23, 2014.

* cited by examiner

MOTOR VEHICLE BODYSHELL STRUCTURE WITH REINFORCEMENTS FOR DISTRIBUTING FORCES RELATED TO A REAR SHOCK ABSORBER OF THE VEHICLE

BACKGROUND

The object of the invention is motor vehicle bodyshell structures and more particularly the points of anchoring of the rear shock absorbers of the vehicle on these bodyshells.

With the development of electric or hybrid vehicles, vehicle architectures are being increasingly frequently encountered in which the rear floor of the vehicle is raised, meaning that it disposed more at the top level of the wheel well instead of being disposed at an intermediate height between the base of the bodyshell and the top of the wheel wells.

As an example, these raised floors make it possible to free up space to install electric storage batteries. But the requirements of impact resistance of the vehicle, especially resistance to certain types of rear-end impact, applied at a standardized height relative to the vehicle, are more favorable to low positioning of the frame rails of the longitudinal structural reinforcements of the vehicle.

To be able to free up the space necessary for positioning of the batteries and at the same time to satisfy the requirements of rear-end impact, certain vehicle architectures therefore have frame rails that are locally offset upwards at the rear of the vehicle. Because of this offset, the rear frame rail, assuming equal section, is more subject to deformation during an impact than an equivalent straight frame rail.

In addition, the rear end of the frame rail in these architectures is no longer positioned facing the normalized point of impact during rear-end impact tests.

This therefore necessitates increasing the section and therefore the mass of the frame rails, as well as adding complementary structure portions designed to transfer the impact energy from the height at which it is applied to the front of the frame rail.

Another problem resulting from the elevation of the rear floor of the vehicle is that the shock absorber fixation towers, which traditionally are attached to the frame rails, tend to be disposed below the vehicle floor and are no longer connected in optimum manner to the upper part of the bodyshell. Thus they cannot be fixed in synergy with this upper part of the bodyshell in order to dissipate part of the forces transmitted by the shock absorber.

BRIEF SUMMARY

The object of the invention is to provide a motor vehicle bodyshell structure that makes it possible to limit the total weight of the bodyshell while making it possible to ensure good resistance of the vehicle to rear-end impact and to assure favorable distribution of the stresses resulting from the shock absorber fixation points, especially for the rear shock absorbers of the vehicle.

To this end, the invention proposes a motor vehicle bodyshell structure comprising a lateral bodyshell superstructure defining, on both sides of the vehicle, two housing portions for wheel wells of the vehicle. The two wheel well housing portions, wherein each housing can receive at least one wheel, are connected by a floor of the vehicle. At the level of each of the two wheel well housing portions, the bodyshell structure comprises a wheel well part and at least one rear shock absorber fixation tower assembled by its rims on each of the wheel well parts. Most often, each wheel well part contributes to bounding a housing that shelters a single vehicle wheel, but in certain alternative embodiments one housing could shelter several wheels of two adjacent axles. The wheel well part defines at least one substantially oblique surface portion around and outside the flanges of the tower. The superstructure additionally comprises a structural metal sheet integral with an oblique surface portion of the wheel well part and integral with a substantially vertical surface portion of the superstructure. Advantageously the floor is a rear floor of the vehicle, and the wheel wells are rear wheel wells of the vehicle. According to an alternative embodiment, the oblique surface portion may be horizontal.

According to a preferred embodiment, the tower has two first substantially vertical walls, substantially parallel to the structural metal sheet, each assembled by at least one flange with the wheel well part, and at least one of which is situated, relative to the structural metal sheet, at a distance that is smaller than or equal to the largest dimension of the tower.

The structure may additionally comprise a rear reinforcing frame rail, wherein the lateral bodyshell superstructure rises above the frame rail. The tower may be assembled with the frame rail by means of an extension piece forming a beam and connecting the frame rail and the tower. Preferably the wheel well portions are offset vertically upward relative to the frame rail.

Preferably the shock absorber fixation tower is assembled with the lateral superstructure and assembled with a reinforcing longitudinal frame rail by means of an extension piece connecting the tower and only a portion of the frame rail. By only a portion of the frame rail there will be understood only a portion of the length of the frame rail in the longitudinal direction of the vehicle. The extension piece has a width, measured in longitudinal direction of the vehicle, substantially equal to that of the tower. The maximum width of the extension piece may typically range between 0.9 and 1.3 times the maximum width of the tower, the term width being used here to designate a dimension along the longitudinal axis of the vehicle. The extension piece positions the tower above the frame rail, meaning in a position offset vertically relative to the frame rail. Advantageously the assembly points between the extension piece and the frame rail are substantially aligned in vertical direction with a rim of the tower. Preferably the vertical offset between the base of the tower and the point closest to the frame rail is at least equal to the height of the tower; the vertical offset between the base of the tower and the point closest to the frame rail may be, for example, between two and ten times the height of the tower. By height there will be understood a dimension measured in a vertical direction of the assembled part in the vehicle. Thus the extension piece has a width that makes it possible to transmit the vertical forces between the tower and the frame rail without closing the entire width of the vertical space between the floor and the frame rail. In this way it is possible, with a part that consumes little material, to transfer the vertical forces of the shock absorber to the frame rail while nevertheless assuring good lateral accessibility to the elements located between the wheels and under the floor. Advantageously the floor is positioned above a limit height of the wheel well openings that are visible on the coachwork exterior to the vehicle.

According to a particularly advantageous embodiment, several parallel structural metal sheets are disposed on both sides of the tower relative to the longitudinal axis of the vehicle.

At least one structural metal sheet can be part of a structure portion forming a four-sided box and a bottom, one side of which is a substantially vertical surface portion of the superstructure and the bottom of which is a portion of the wheel well part.

According to an advantageous embodiment, the shock absorber fixation tower is positioned to be substantially in the horizontal prolongation of the rear floor. For example, the minimum rear floor height can be located between the assembled height of the tower bottom and a maximum height of a rim of the tower.

Advantageously the extension piece has a beam geometry of substantially U-shaped section, wherein the beam axis is oriented substantially vertically and at least two parallel rims of the U-shaped section are placed in the prolongations of the two first substantially vertical walls of the tower.

The two first parallel rims of the U-shaped section are preferably assembled, for example by welding, with the two first substantially vertical walls of the tower. The U-shaped section may transition between the point or points of fixation on the frame rail and between the assembly zones between tower and extension piece. For example, the U-shape may not be entirely symmetric, and the height of the rims of the U-shape may increase between the frame rail and the tower. At the level of the zones of assembly with the tower, the height of the U-shape may be chosen to be sufficient that the rims of the beam completely surround the two first walls of the tower, at least in a right section plane of the beam. The two first walls of the tower may be completely lined over their vertical portion by two first rims of the U-shaped beam of the extension piece.

According to one embodiment, the tower has at least one third substantially vertical or oblique lateral wall joining the two first walls, and the tower has a substantially horizontal bottom wall joining the two first walls and placed in the continuity of the third wall. By oblique, there will be understood here a direction that is neither vertical not horizontal, when the vehicle is placed in usual riding position on a level road.

According to a preferred embodiment, the open side of the U-shaped section of the extension piece is turned toward the lateral side of the vehicle which is exterior to the vehicle, and the third lateral wall of the tower is located on the side exterior to the vehicle, and therefore on the open side of the U-shape. The tower may not have a fourth wall, or it may have a substantially vertical fourth wall facing the third wall. The first, second, third and fourth walls may each be connected to the bottom wall of the tower by a curved wall portion in order to limit the stress concentrations in the transition zones between the bottom wall of the tower and at least one of the lateral walls of the tower, each comprising preferably at least one vertical wall portion. According to a preferred embodiment, the height of the fourth wall is smaller than the height of the third wall. Of course, other embodiments can be envisioned. The third and the fourth walls of the tower may be of substantially equal height, or the highest wall may border the tower on the side interior to the vehicle. The open side of the U-shape may be turned toward the interior of the vehicle, and/or the base of the U-shape may be disposed in the continuity of the third wall.

The bottom wall of the tower may typically be perforated to receive, for example, a fixation screw of the shock absorber.

A reinforcing part may be assembled on the bottom of the tower to increase the bending resistance of the bottom of the tower. Ribs may be formed by deep drawing so as to connect the bottom of the tower and at least one of the substantially vertical walls of the tower along a curved path, in such a way as to stiffen the tower as a whole and to facilitate the transmission of forces between the bottom of the tower, where the end of the shock absorber is assembled, and the walls of the tower connected to the sides of the U-shaped beam.

Advantageously, the two first walls and the third wall may be assembled with the wheel well part by welding two first flanges of the two first walls and by welding a third flange of the third wall, the flanges being folded so as to be disposed substantially in a common plane with an interior flange of an opening of the wheel well part. According to a preferred embodiment, the tower is open upwards, meaning that the shock absorber is braced on the bottom of the tower while remaining outside the tower. The tower is preferably assembled with the lateral superstructure in such a way that the opening of the tower is flush at the bottom with the level of an opening of the wheel well part. This orientation of the tower makes it possible to assemble the tower via three of its vertical walls with the U-shaped beam, and makes it possible to assemble the tower via the flanges of the tower with the wheel well part. In this way the distribution of forces of the shock absorber between the U-shaped beam and the wheel well part is optimized. According to an advantageous embodiment, the wheel well part has a lower rim that is on the same level as a rim of the floor and that is assembled with this floor rim.

The tower may have at least one third substantially vertical or oblique third wall joining the two first walls, it may have a substantially horizontal bottom wall joining the two first walls and placed in the continuation of the third wall, and it may be assembled via the flanges of the two first walls and of the third wall with the wheel well part.

Advantageously, the tower is also assembled with the wheel well part along a flange that is disposed along the bottom wall of the tower or along a flange that is disposed along a fourth wall of the tower. According to an advantageous embodiment, the third wall of the tower may be lined by a central portion of the U-shaped beam, wherein the central portion is the central web of the beam joining the two webs forming the sides of the U-shape of the beam. According to another embodiment, it is a flange of the bottom of the tower, i.e. the fourth wall, or it is a flange of the fourth wall that is assembled with the central portion of the U-shaped beam. The U-shaped beam therefore surrounds the tower over at least two faces and preferably over three faces. The faces in question are the first wall, the second wall and either the third or the fourth wall.

The tower may also be assembled with the wheel well part along a flange that is disposed along either the bottom wall of the tower or along a fourth wall opposite the third wall and of height smaller than the height of the third wall.

According to a preferred embodiment, the extension piece is assembled with the tower in at least several different points of each of the two first walls of the tower.

Preferably the extension piece is assembled with the tower in at least three points of each of the two first walls of the tower. According to an advantageous embodiment, the extension piece may additionally be assembled directly with the wheel well part along certain portions of the interior flange of the opening of the wheel well part.

The invention also proposes a motor vehicle comprising a lateral bodyshell superstructure defining, on both sides of the vehicle, two portions, right and left, of wheel well housings of the vehicle. The two right and left wheel well housing portions are connected by a floor of the vehicle. At the level of each wheel well housing portion, the vehicle comprises a wheel well part and at least one shock absorber fixation tower assembled with each of the wheel well parts. The wheel well part defines at least one substantially oblique surface portion around and beyond the flanges of the tower. The superstructure additionally comprises a structural metal sheet integral with an oblique surface portion of the wheel well part and integral with a substantially vertical surface portion of the superstructure.

BRIEF DESCRIPTION OF THE DRAWINGS

Other objectives, characteristics and advantages of the invention will become apparent upon reading the description hereinafter, given merely by way of example, which is in no way limitative, and referring to the attached drawings, wherein.

DETAILED DESCRIPTION

Figure 1:
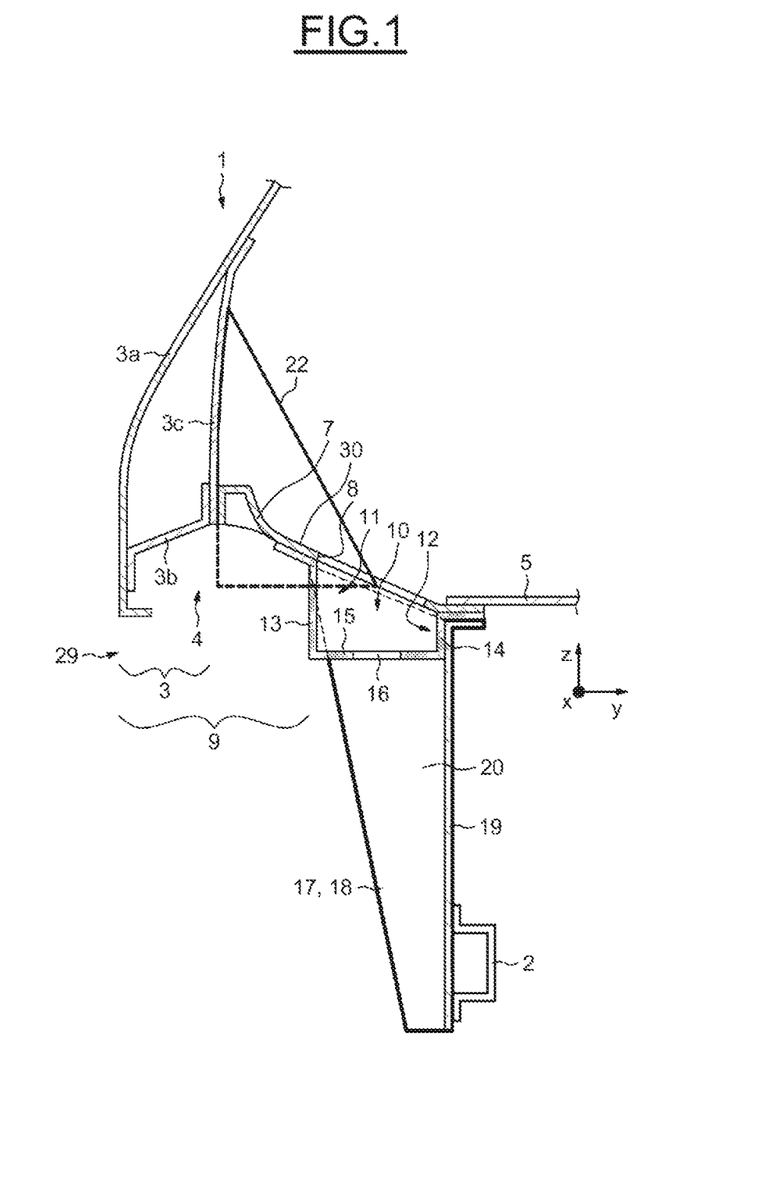
FIG. 1 is a simplified sectional view of a bodyshell structure portion according to the invention.
Figure 2:
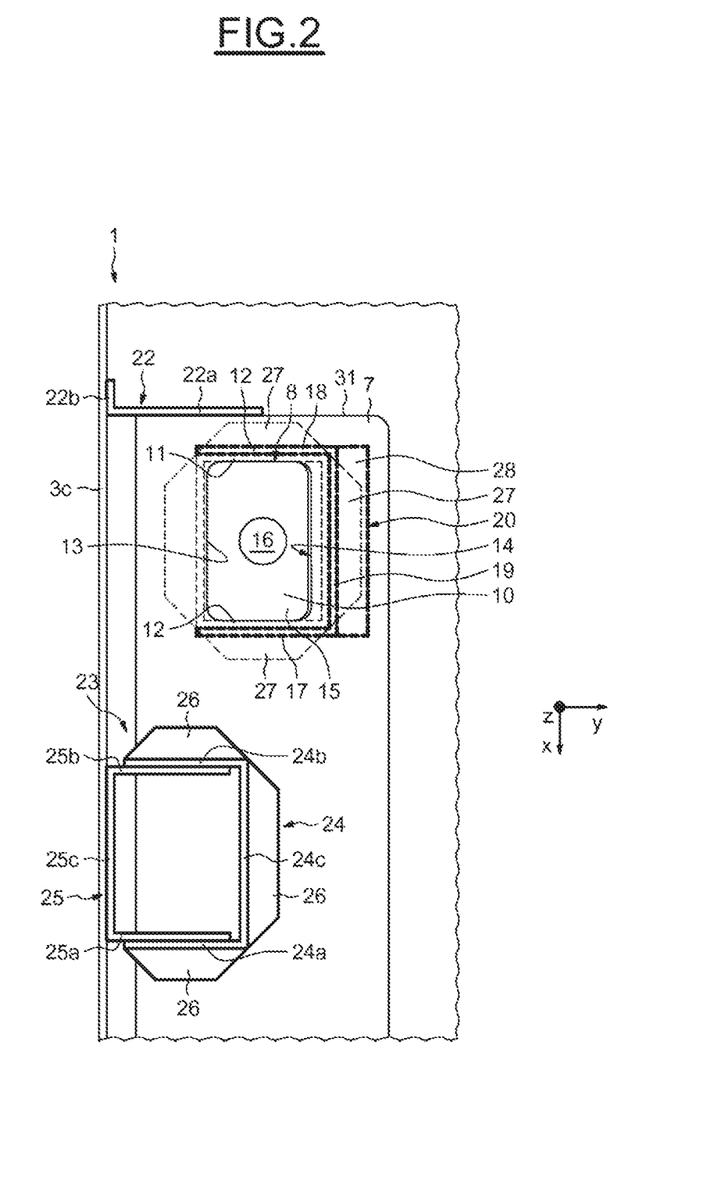
FIG. 2 is an overhead view of the bodyshell structure portion of FIG. 1.
Figure 3:
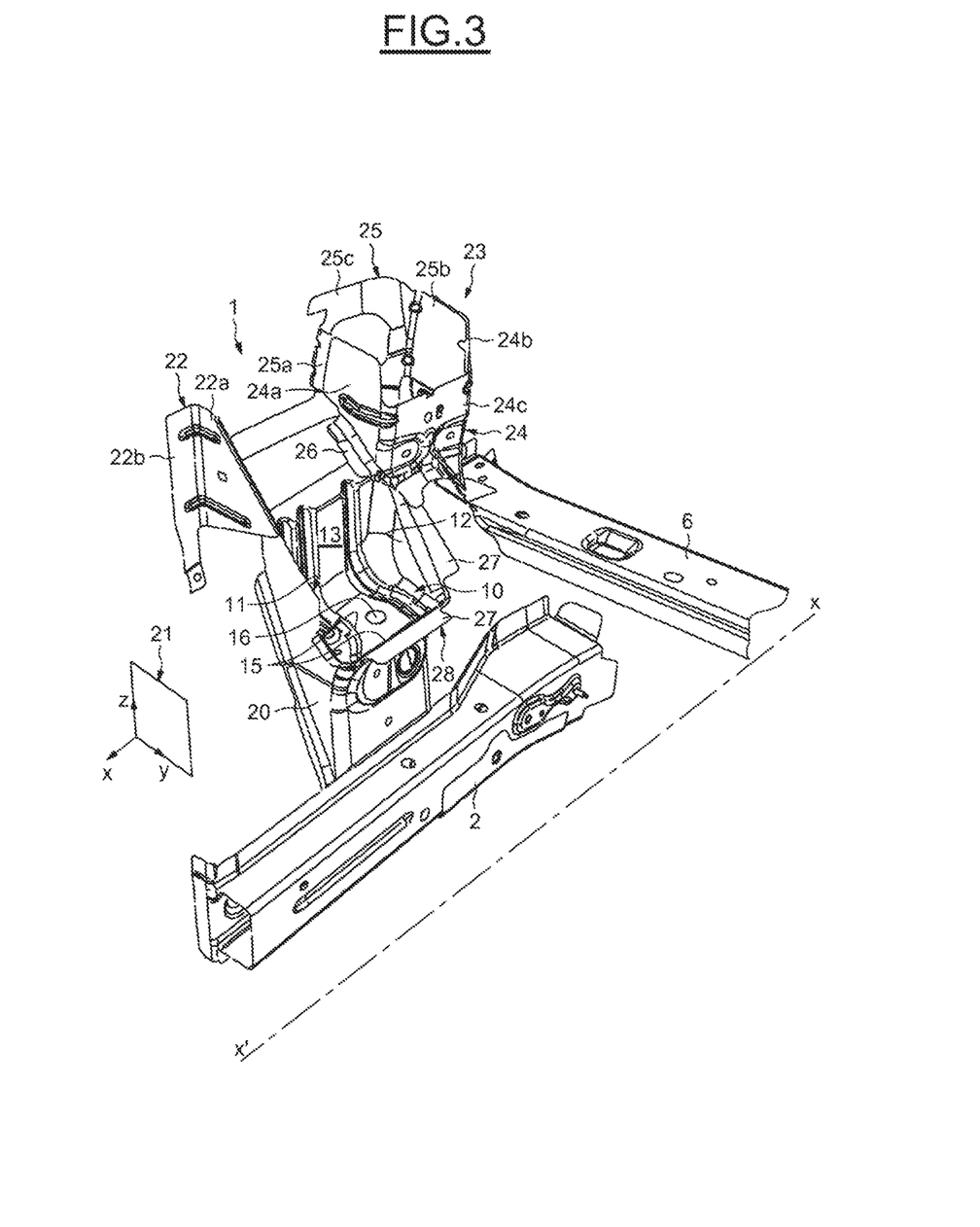
FIG. 3 is a perspective view of some characteristic elements of another bodyshell structure according to the invention.

In FIGS. 1, 2 and 3, the x-axis represents a longitudinal axis of the vehicle, the y-axis represents a transversal axis of the vehicle and the z-axis represents a vertical axis.

The structures represented in FIGS. 1, 2 and 3 are present at least two times in the vehicle, in each case with two structures that are symmetric relative to an axis parallel to the x-axis and passing through the middle of the vehicle.

As illustrated in FIGS. 1 and 2, a motor vehicle bodyshell structure 1 (not represented) according to the invention comprises a frame rail 2 disposed in longitudinal manner along the vehicle and extending at least partly to the rear end of the vehicle. The structure comprises a substantially vertical portion 3 of a lateral superstructure 9 in which there is made a wheel well opening 29 making it possible to mount a wheel on the vehicle below lateral superstructure 9, and comprises a rear floor 5 that is raised, i.e. placed vertically above frame rails 2.

Rear floor 5 is not necessarily located directly above frame rails 2 but in any case is offset vertically upward relative thereto. Floor 5 is connected to lateral superstructure 9 by a wheel well part 7, which defines at least one oblique surface portion 30 and is assembled, on the side interior to the vehicle (relative to a transversal direction of the vehicle), with rear floor 5, and is assembled, on the side exterior to the vehicle, with lateral superstructure 9.

Lateral superstructure 9 comprises at least one substantially vertical portion 3, which may comprise, for example, an exterior portion of guard 3a, comprising an exterior finishing metal sheet, an interior guard portion 3c on which are assembled diverse elements interior to the vehicle, and an intermediate guard portion 3b connecting exterior guard portion 3a and interior guard portion 3c in such a way as to leave an empty space between the interior and exterior portions to facilitate assembly of diverse elements on interior portion 3c. Intermediate portion 3b defines a radially exterior portion of a wheel well housing 4, in the interior of which a vehicle wheel may be inserted by passage through opening 29. The rest of the depth (along the y-axis) of wheel well housing 4 is defined by wheel well part 7.

A shock absorber fixation tower 10 is assembled on wheel well part 7. An opening 8 is made in wheel well part 7, below which tower 10 is assembled underneath wheel well part 7, wherein the rims of tower 10 are braced on wheel well part 7 and are assembled therewith around opening 8. Bottom 15 of tower 10 is offset downward relative to wheel well part 7.

Bottom 15 may be perforated with a bore 16 that permits the assembly of the end of the rear shock absorber (not represented). This bottom 15 may if necessary be lined with a reinforcing metal sheet (not represented).

Tower 10 is connected to frame rail 2 by an extension piece 20, which thus connects lateral superstructure 9 with frame rail 2.

Extension piece 20, as can be seen in the overhead view of FIG. 2, has a U-shaped beam section, wherein the two arms 17, 18 of the U-shape extend in the y-axis transversal to the vehicle and the base 19 of the U-shape extends in the x-axis. Extension piece 20 is welded to or otherwise assembled on frame rail 2, and is also integral, via portions forming arms 17, 18 of the U-shape, with tower 10. As can be seen in FIG. 2, extension piece 20 surrounds tower 10, which has a substantially rectangular or square section. Tower 10 has a first tower wall 11 and a second tower wall 12 substantially parallel to the transversal y-axis. Tower 10 has a third tower wall 13 bordering the tower on the side exterior to the vehicle (relative to the y-axis) and a fourth wall 14 that may if necessary be of zero height and that borders tower 10 on the side interior to the vehicle.

Of course, elements common to FIG. 1 are shown in FIG. 2, where like elements are represented by like reference numerals. However, to simplify the drawing, floor 5 and frame rail 2 have not been represented in FIG. 2.

Extension piece 20 has a U-shaped section, wherein this section comprises a first parallel rim 17 and a second parallel rim 18, both parallel to the transversal y-axis of the vehicle (or at least forming a symmetric angle relative to this y-axis transversal to the vehicle), and it has a third rim 19 forming the base of the U-shaped section and which is substantially parallel to the longitudinal direction x of the vehicle.

The first and second walls of the tower are substantially vertical or end in a substantially vertical portion. The first rims, second rims and base rims of the U-shaped section of extension piece 20 also form substantially vertical planes. The parallel first and second rims of extension piece 20 are assembled with the first and second walls 11 and 12 respectively of tower 10. The third rim or base rim of the U-shaped section is assembled here with the fourth wall of the tower, which is situated on the side interior to the vehicle. It is also possible to envision alternative embodiments in which this third rim of extension piece 20 is assembled with the third tower wall disposed on the side exterior to the vehicle.

Tower 10 is assembled with wheel well part 7 via tongues 27 disposed along the rims of the first, second, third and fourth walls of tower 10.

Extension piece 20 may also have one or more tongues 28 for making extension piece 20 integral with wheel well part 7, possibly by interposing a tongue 27 of tower 10 between a tongue 28 and wheel well part 7.

As is visible in both FIGS. 1 and 2, motor vehicle bodyshell structure 1 also comprises a structural metal sheet 22 of substantially square shape. Structural metal sheet 22 comprises at least one substantially vertical force-absorbing portion 22a, which is substantially parallel to first wall 11 and to second wall 12 of tower 10, as well as to first parallel rim 17 and to second parallel rim 18 of extension piece 20.

All of these vertical portions 22a, 11, 12, 17, 18 of bodyshell structure parts are all parallel to a geometric plane 21 which is vertical and transversal relative to the vehicle. Plane 21 is represented in FIG. 3, and has the y-axis and z-axis as director axes. It is possible to envision alternative embodiments in which plane 21, which is common to structural sheet 22, first and second walls 11, 12 of tower 10, first and second parallel rims 17, 18 of the U-shaped section of extension piece 20, is not strictly vertical, or is not strictly transversal relative to the vehicle. Preferably, however, plane 21 remains inclined by less than 10° relative to the vertical and preferably remains inclined by less than 5° relative to the vertical.

The inclination of plane 21 relative to the y-axis may depend on a local curvature of frame rail 2 on which extension piece 20 is assembled. Plane 21 may then be perpendicular to the frame rail. It is possible to envision alternative embodiments in which first and second rims 17, 18 of extension piece 20 would not be parallel but would be convergent or divergent (as viewed over a cross section of the beam forming the extension piece). First and second tower walls 11, 12 may then be convergent or divergent, in such a way that the first tower wall is assembled with the first rim of the extension piece and the second tower wall with the second rim of the extension piece. A structural metal sheet 22 may then be positioned in such a way that it is parallel to the one of first and second tower walls 11, 12 which is closest to structural metal sheet 22, or may be in a plane transversal to the vehicle.

Structural metal sheet 22 is placed close to at least one among the first and second tower walls, in such a way that it can efficiently absorb part of the vertical forces transmitted by the shock absorber to tower 10 then via tower 10 to wheel well part 7. Structural metal sheet 22 may comprise a portion 22b that is also vertical and substantially perpendicular to force-absorbing portion 22a. Portion 22b is assembled with the interior portion of guard 3c and makes it possible to transfer the vertical forces received by force-absorbing portion 22a to the interior portion of guard 3c. Structural metal sheet 22 is also integral with wheel well part 7 over at least one portion of the lower rim of force-absorbing portion 22a. An assembly tongue (not represented) of structural metal sheet 22 may make an angle with portion 22a and be assembled on oblique surface portion 30 of wheel well part 7. According to another alternative embodiment, force-absorbing portion 22a may be assembled in the lower part with a substantially vertical portion 31 of wheel well part 7, bordering wheel well part 7 in a plane direction substantially perpendicular to the interior portion of guard 3c. According to yet another embodiment, which may be combined with those in the foregoing, structural metal sheet 22 may be assembled via its portion 22a with a third part (not represented) comprising a metal sheet portion that is also parallel to plane 21 and is placed in the prolongation of force-absorbing portion 22a, wherein that third part is itself also integral with wheel well part 7.

Thus the vertical forces transmitted by the rear shock absorber (not represented) to tower 10 can be transmitted by the rims of tower 10 via extension piece 20 of frame rails 2 and can also be partly transmitted by tower 10 to wheel well part 7, then by structural metal sheet 22, then toward lateral superstructure 9, the direction of which is favorable for absorption of vertical forces. It is possible to envision alternative embodiments in which wheel well part 7 is not oblique but is horizontal.

In order to favor the transfer of vertical forces to the upper part of the bodyshell structure, especially to lateral superstructure 9, structural metal sheet 22 is situated close to tower 10, typically at a distance shorter than the largest dimension of the tower itself, this minimum distance being respected both concerning the distance along the x-axis and concerning the distance along the y-axis.

According to an advantageous embodiment, structural metal sheet 22 is assembled with wheel well part 7 in such a way that the total assembly length along the y-axis, between structural metal sheet 22 and wheel well part 7, is at least equal to half and preferably two thirds of the minimum distance along this y-axis between one of the lateral walls of the tower and a substantially vertical portion of the superstructure, for example interior guard portion 3c. In certain particularly advantageous embodiments, the total assembly length is even greater than this minimum distance, in such a way that a portion of structural metal sheet 22 is disposed along at least one portion of a lateral wall 11, 12 of tower 10. In this way the absorption, by the structural metal sheet, of the forces transmitted by tower 10 to wheel well part is improved.

Structural metal sheet 22 may be assembled with wheel well part 7 by tongues parallel to oblique surface portion 30 of wheel well part 7, or by a portion of wheel well part 7, which in contrast is vertical and assembled on a vertical portion of structural metal sheet 22.

Furthermore, structural metal sheet 22 may result from an assembly of several parts, each containing at least one substantially plane portion parallel to axis 21, wherein all of the portions parallel to axis 21 are assembled to form a force transfer plate both integral with wheel well part 7 and integral with portion 3 of lateral superstructure 9.

In order to improve the transfer of vertical forces from wheel well part 7 close to tower 10 to lateral superstructure 9 even more, other vertical force-transferring elements may be added that are integral both with wheel well part 7 and lateral superstructure 9.

These elements preferably have one or more vertical planes connecting wheel well part 7 and lateral superstructure 9. At least some of these vertical planes are preferably parallel to plane 21 and parallel to first and second walls 11, 12 of tower 10. At least one of these parallel vertical planes is disposed close to tower 10, i.e. at a distance along the x-axis and at a distance along the y-axis that is smaller than the largest dimension of the tower.

Thus, in FIG. 2, it is possible to see a belt winding box 23 comprising a front part 24 and a rear part 25. Rear part 25 comprises a bottom portion 25c joined to and fixed on the interior portion of guard 3c, and it comprises two lateral walls 25a and 25b parallel to force-transmission plane 21.

Box 23 also comprises a front part 24 comprising a front wall 24c parallel with rear wall 25c and comprising two lateral walls 24a and 24b assembled on lateral walls 25a and 25b of rear part 25. Front part 25 additionally comprises assembly tongues 26 for making the base of front piece 24 integral with wheel well part 7.

Assembly tongues 26 are disposed along a length greater than at least half of the length of lateral walls 24a and 24b along the y-axis, in such a way that the vertical forces can be transmitted effectively from wheel well part 7 to winder box assembly 23 then to lateral superstructure 9.

Winder box 23 is not visible in FIG. 1, because it is disposed in front of the section plane of that figure.

FIG. 3 is a perspective representation of a bodyshell structure similar to that represented in FIGS. 1 and 2. Elements common to FIGS. 1 and 2 are also shown in FIG. 3, where like elements are denoted by like reference numerals. In particular, an extension piece 20 in the form of a beam with right U-shaped section is shown in FIG. 3, the rims of the U-shape surrounding the lateral walls of a shock absorber fixation tower 10.

Wheel well part 7 is not represented in FIG. 3, so that the contours of tower 10 and of extension piece 20 can be better seen. On the other hand, structural metal sheet 22 in square shape and a belt winder box 23 disposed in this case toward the rear of the vehicle relative to structural metal sheet 22 are shown in FIG. 3.

Floor 5 is not represented in FIG. 3, but it is possible to see a rear floor crossbeam 6 indicating the assembly height of the floor.

By virtue of the bodyshell structure according to the invention, a space can be made available underneath the rear floor of the vehicle while still retaining good resistance to rear-end impact of the vehicle by virtue of a low position of the longitudinal reinforcing frame rails.

Extension piece 20, which represents a reduced material cost, makes it possible to transmit the forces from the rear shock absorber (not represented) to reinforcing frame rail 2. Force-transferring elements 22, 23 make it possible to transmit the forces from the rear shock absorber (not represented) to lateral superstructure 9.

The invention is not limited to the described exemplary embodiments and may be developed into numerous variants. It is possible to envision a bodyshell structure containing an extension piece 20 such as described in the foregoing and not containing structural metal sheets 22.

It is possible to envision a bodyshell structure in which tower 10 would be connected to frame rail 2 by a part other than the U-shaped beam described in the foregoing, and in contrast containing one or more structural metal sheets 22 and/or a force-transferring element in the form of a box such as winder box 23.

It could be that preferential plane 21 for absorbing vertical forces is not parallel to the y-axis transversal to the vehicle. The tower could be assembled in such a way that the tower bottom is turned toward the top of the vehicle. Extension piece 20 in the form of a U-shaped beam could have the opening of the U-shape turned toward the interior of the vehicle. Extension piece 20 could have a shape surrounding tower 10 in the upper part and transitioning toward a beam of different section in the lower part, for example toward a closed rectangular section or a closed triangular section, The contour of the tower itself in overhead view could be triangular or trapezoidal. The part of the beam surrounding the tower may have a closed section surrounding all of the lateral walls of the tower. It could be that the level of the rear floor does not correspond to the base of the opening of wheel well part 7 receiving tower 10.

Demountable assemblies could completely or partly replace the welded assemblies connecting frame rail 2, extension piece 20, tower 10, wheel well part 7, structural metal sheet 22, front part 24 and rear part 25 of belt winding box 23.

The invention claimed is:

1. A motor vehicle bodyshell structure comprising:
a lateral bodyshell superstructure defining, on both sides of the vehicle, two housing portions for wheel wells of the vehicle connected by a floor of the vehicle,
wherein the bodyshell structure comprises, at a level of each of the two wheel well housing portions, a wheel well part and at least one rear shock absorber fixation tower including rims and assembled by the rims on each of the wheel well parts, the wheel well part defining at least one substantially oblique surface portion around and outside flanges of the tower, and
the bodyshell superstructure further comprises a structural metal sheet integral with the oblique surface portion of the wheel well part and integral with a substantially vertical surface portion of the bodyshell superstructure,
wherein the floor of the vehicle is positioned directly on top of each of the wheel well parts and above where at least one of the rims of the tower is connected to each of the wheel well parts.

2. A structure according to claim 1, wherein the tower includes two first substantially vertical walls, substantially parallel to the structural metal sheet, each assembled by at least one flange extending from the top of the vertical walls with a bottom face of the wheel well part, and at least one of which is situated, relative to the structural metal sheet, at a distance that is smaller than or equal to a largest dimension of the tower.

3. A structure according to claim 1, further comprising a rear reinforcing frame rail, wherein the lateral bodyshell superstructure rises above the frame rail, and wherein the tower is assembled with the frame rail by an extension piece forming a beam and connecting the frame rail and the tower.

4. A structure according to claim 1, comprising plural parallel structural metal sheets, disposed on both sides of the tower relative to the longitudinal axis of the vehicle.

5. A structure according to claim 1, wherein at least one structural metal sheet is part of a structure portion forming a four-sided box and a bottom, one side of which is a substantially vertical surface portion of the superstructure and the bottom of which is a portion of the wheel well part.

6. A structure according to claim 3, wherein the extension piece has a beam geometry of substantially U-shaped section, wherein the z-axis of the beam is oriented substantially vertically and at least two parallel rims of the U-shaped section are placed in prolongations of two first substantially vertical walls of the tower.

7. A structure according to claim 6, wherein the tower includes at least one third substantially vertical or oblique lateral wall joining the two first walls, includes a substantially horizontal bottom wall including a bore for assembly of a rear shock absorber and joining the two first walls and placed in continuity of the third wall, wherein the tower is assembled via flanges of the two first walls and of the third wall with the wheel well part, and wherein the bottom wall is positioned below where the tower is assembled via the flanges of the two first walls and of the third wall with the wheel well part.

8. A structure according to claim 7, wherein the tower is further assembled with the wheel well part along a flange that is disposed either along a bottom wall of the tower or along a fourth wall opposite the third wall and of height smaller than height of the third wall.

9. A structure according to claim 3, wherein the extension piece is assembled with the tower in at least plural different points of each of the two first walls of the tower.

10. A motor vehicle comprising:
a lateral bodyshell superstructure defining, on both sides of the vehicle, two portions, right and left, of wheel well housings of the vehicle, the two right and left wheel well housing portions being connected by a floor of the vehicle,
wherein, at a level of each wheel well housing portion, the vehicle comprises, a wheel well part and at least one shock absorber fixation tower including rims and assembled by the rims with each of the wheel well parts, the wheel well part defining at least one substantially oblique surface portion around and beyond flanges of the tower,
wherein the bodyshell superstructure comprises a structural metal sheet integral with an oblique surface portion of the wheel well part and integral with a substantially vertical surface portion of the bodyshell superstructure, and wherein the floor of the vehicle is positioned directly on top of each of the wheel well parts and above where at least one of the rims of the tower is connected to each of the wheel well parts.

11. A motor vehicle according to claim 10, wherein the tower includes two first substantially vertical walls, substantially parallel to the structural metal sheet, each assembled by at least one flange extending from the top of the vertical walls with a bottom face of the wheel well part, and at least one of which is situated, relative to the structural metal sheet, at a distance that is smaller than or equal to a largest dimension of the tower.

12. A motor vehicle according to claim 10, wherein the tower includes at least two first substantially vertical walls and a substantially horizontal bottom wall including a bore for assembly of a rear shock absorber and joining the two first walls, wherein the tower is assembled via flanges of the two first walls with the wheel well part, and wherein the bottom wall is positioned below where the tower is assembled via the flanges of the two first walls with the wheel well part.

* * * * *